(12) United States Patent
Hinderliter (10) Patent No.: US 12,115,470 B2
(45) Date of Patent: Oct. 15, 2024

(54) FUEL OXYGEN REDUCTION UNIT

(71) Applicant: General Electric Company, Schenectady, NY (US)

(72) Inventor: Kevin Edward Hinderliter, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 7 days.

(21) Appl. No.: 17/241,206

(22) Filed: Apr. 27, 2021

(65) Prior Publication Data

US 2022/0339558 A1     Oct. 27, 2022

(51) Int. Cl.
*B01D 19/00* (2006.01)
*F02C 7/22* (2006.01)

(52) U.S. Cl.
CPC ..... *B01D 19/0063* (2013.01); *B01D 19/0005* (2013.01); *F02C 7/22* (2013.01); *B01D 2257/104* (2013.01)

(58) Field of Classification Search
CPC ......... B64D 37/34; F02M 37/22; F02C 7/232; F02C 7/22; B60K 3/04
See application file for complete search history.

(56) References Cited

U.S. PATENT DOCUMENTS

| | | |
|---|---|---|
| 2,582,842 A | 1/1952 | Messinger |
| 2,720,313 A | 10/1955 | Pattison |
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,264,844 A | 4/1981 | Axe et al. |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

Kelburn Engineering, Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

*Primary Examiner* — Youngsul Jeong
(74) *Attorney, Agent, or Firm* — Dority & Manning, P.A.

(57) ABSTRACT

A fuel oxygen reduction unit is provided for reducing an oxygen content of a flow of liquid fuel to an engine. The fuel oxygen reduction unit includes: a stripping gas supply line for providing a flow of stripping gas; a contactor defining a liquid fuel inlet, a stripping gas inlet and a fuel/gas mixture outlet, the stripping gas supply line in airflow communication with the stripping gas inlet; a means for modulating the flow of stripping gas through the stripping gas supply line; and a controller operable with the means for modulating the flow of stripping gas through the stripping gas supply line to modulate the flow of stripping gas through the stripping gas supply line in response to an engine operability parameter.

11 Claims, 3 Drawing Sheets

(56) References Cited

U.S. PATENT DOCUMENTS

| | | | |
|---|---|---|---|
| 4,449,372 A | 5/1984 | Rilett | |
| 4,503,682 A | 3/1985 | Rosenblatt | |
| 4,505,124 A | 3/1985 | Mayer | |
| 4,550,573 A | 11/1985 | Rannenberg | |
| 4,600,413 A | 7/1986 | Sugden | |
| 4,714,139 A | 12/1987 | Lorenz et al. | |
| 4,738,779 A | 4/1988 | Carroll et al. | |
| 4,755,197 A | 7/1988 | Benson et al. | |
| 4,773,212 A | 9/1988 | Griffin et al. | |
| 5,149,018 A | 9/1992 | Clark | |
| 5,267,608 A | 12/1993 | Coffinberry | |
| 5,341,636 A | 8/1994 | Paul | |
| 5,452,573 A | 9/1995 | Glickstein et al. | |
| 5,587,068 A | 12/1996 | Aho, Jr. et al. | |
| 5,622,621 A | 4/1997 | Kramer | |
| 5,667,168 A | 9/1997 | Fluegel | |
| 5,722,241 A | 3/1998 | Huber | |
| 5,724,806 A | 3/1998 | Homer | |
| 5,904,836 A | 5/1999 | Lee et al. | |
| 6,134,876 A | 10/2000 | Hines et al. | |
| 6,176,078 B1 | 1/2001 | Balko et al. | |
| 6,182,435 B1 | 2/2001 | Niggemann et al. | |
| 6,250,097 B1 | 6/2001 | Lui et al. | |
| 6,294,091 B1 | 9/2001 | Hoff | |
| 6,315,815 B1 * | 11/2001 | Spadaccini | B01D 61/00 |
| | | | 96/6 |
| 6,415,595 B1 | 7/2002 | Wilmot, Jr. et al. | |
| 6,435,454 B1 | 8/2002 | Engelhardt | |
| 6,453,660 B1 | 9/2002 | Johnson et al. | |
| 6,701,717 B2 | 3/2004 | Flatman et al. | |
| 6,702,729 B2 | 3/2004 | Mazzuca | |
| 6,892,710 B2 | 5/2005 | Ekstam | |
| 6,939,392 B2 | 9/2005 | Huang et al. | |
| 7,093,437 B2 | 8/2006 | Spadaccini et al. | |
| 7,114,337 B2 | 10/2006 | Cazalens et al. | |
| 7,260,926 B2 | 8/2007 | Sabatino et al. | |
| 7,334,407 B2 | 2/2008 | Spadaccini et al. | |
| 7,377,098 B2 | 5/2008 | Walker et al. | |
| 7,387,602 B1 | 6/2008 | Kirsch | |
| 7,398,641 B2 | 7/2008 | Stretton et al. | |
| 7,431,818 B2 | 10/2008 | Cipollini | |
| 7,459,081 B2 | 12/2008 | Koenig et al. | |
| 7,536,851 B2 | 5/2009 | McLain | |
| 7,569,099 B2 | 8/2009 | Coffin et al. | |
| 7,628,965 B2 | 12/2009 | Johnson et al. | |
| 7,694,916 B2 | 4/2010 | Limaye et al. | |
| 7,735,670 B2 | 6/2010 | Zaki et al. | |
| 7,744,827 B2 | 6/2010 | Vanderspurt et al. | |
| 7,824,470 B2 | 11/2010 | Chiappetta et al. | |
| 7,836,680 B2 | 11/2010 | Schwarz et al. | |
| 7,882,704 B2 | 2/2011 | Chen | |
| 7,896,292 B2 | 3/2011 | Limaye et al. | |
| 7,905,259 B2 | 3/2011 | Johnson et al. | |
| 7,966,807 B2 | 6/2011 | Norris et al. | |
| 7,987,676 B2 | 8/2011 | Ast et al. | |
| 8,015,813 B2 | 9/2011 | Cazalens et al. | |
| 8,055,437 B2 | 11/2011 | Proietty et al. | |
| 8,141,360 B1 | 3/2012 | Huber | |
| 8,177,884 B2 | 5/2012 | Schmidt et al. | |
| 8,231,714 B2 | 7/2012 | Cornet et al. | |
| 8,242,404 B2 | 8/2012 | Miller et al. | |
| 8,261,258 B1 | 9/2012 | Chillar et al. | |
| 8,388,830 B2 | 3/2013 | Sohn et al. | |
| 8,450,020 B2 | 5/2013 | Sinha et al. | |
| 8,499,567 B2 | 8/2013 | Hagh et al. | |
| 8,499,822 B2 | 8/2013 | Bulin et al. | |
| 8,522,572 B2 | 9/2013 | Coffinberry et al. | |
| 8,602,362 B2 | 12/2013 | Buchwald | |
| 8,663,996 B2 | 3/2014 | Beeson | |
| 8,765,070 B2 | 7/2014 | Norton et al. | |
| 8,789,377 B1 | 7/2014 | Brostmeyer | |
| 8,821,362 B2 | 9/2014 | Kidd et al. | |
| 8,828,344 B2 | 9/2014 | K-Wlam et al. | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 9,014,791 B2 | 4/2015 | Held | |
| 9,038,397 B2 | 5/2015 | Papa et al. | |
| 9,120,580 B2 | 9/2015 | Sampath | |
| 9,144,768 B2 | 9/2015 | Tichborne et al. | |
| 9,162,162 B2 | 10/2015 | Yount | |
| 9,231,267 B2 | 1/2016 | McAlister | |
| 9,435,246 B2 | 9/2016 | Devarakonda | |
| 9,567,095 B2 | 2/2017 | McCarthy et al. | |
| 9,580,185 B2 | 2/2017 | Rhoden et al. | |
| 9,656,187 B2 | 5/2017 | Lo et al. | |
| 9,657,643 B2 | 5/2017 | Veilleux, Jr. | |
| 9,687,773 B2 | 6/2017 | Johnson et al. | |
| 9,724,625 B2 | 8/2017 | Lo | |
| 9,752,507 B2 | 9/2017 | Selstad et al. | |
| 9,771,867 B2 | 9/2017 | Karam et al. | |
| 9,834,315 B2 | 12/2017 | Lo et al. | |
| 9,863,322 B2 | 1/2018 | Williams et al. | |
| 9,885,290 B2 | 2/2018 | Della-Fera et al. | |
| 9,897,054 B2 | 2/2018 | Lo et al. | |
| 9,897,100 B2 | 2/2018 | Laboda et al. | |
| 10,060,618 B2 | 8/2018 | Juan | |
| 10,456,722 B2 | 10/2019 | Dyer | |
| 2007/0006591 A1 | 1/2007 | Spadaccini et al. | |
| 2007/0163433 A1 | 7/2007 | Chen et al. | |
| 2009/0133380 A1 | 5/2009 | Donnerhack | |
| 2009/0158739 A1 | 6/2009 | Messmer | |
| 2009/0165436 A1 | 7/2009 | Herbon et al. | |
| 2009/0188234 A1 | 7/2009 | Suciu et al. | |
| 2010/0101231 A1 | 4/2010 | Westmeier | |
| 2010/0212857 A1 | 8/2010 | Bulin et al. | |
| 2010/0294128 A1 | 11/2010 | Schmidt et al. | |
| 2010/0313591 A1 | 12/2010 | Lents et al. | |
| 2011/0262309 A1 | 10/2011 | Limaye et al. | |
| 2012/0216502 A1 | 8/2012 | Freund et al. | |
| 2012/0216677 A1 | 8/2012 | Koenig et al. | |
| 2013/0186100 A1 | 7/2013 | Rhoden et al. | |
| 2014/0165570 A1 | 6/2014 | Herring | |
| 2014/0205446 A1 | 7/2014 | Patsouris et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0072850 A1 | 3/2015 | Derrick et al. | |
| 2015/0159867 A1 | 6/2015 | Patrick et al. | |
| 2015/0375868 A1 | 12/2015 | Smith et al. | |
| 2016/0003160 A1 | 1/2016 | Hagshenas | |
| 2016/0096629 A1 | 4/2016 | Vaisman | |
| 2016/0108814 A1 | 4/2016 | Schmitz | |
| 2016/0138431 A1 | 5/2016 | Lear, Jr. | |
| 2016/0167802 A1 * | 6/2016 | Lo | B64D 37/34 |
| | | | 96/187 |
| 2016/0208759 A1 | 7/2016 | Lo et al. | |
| 2016/0245144 A1 | 8/2016 | Selberg et al. | |
| 2016/0290214 A1 | 10/2016 | Ekanayake et al. | |
| 2016/0305440 A1 | 10/2016 | Laboda et al. | |
| 2016/0356224 A1 | 12/2016 | Farnum et al. | |
| 2016/0369700 A1 | 12/2016 | Ribarov et al. | |
| 2017/0030266 A1 | 2/2017 | Cerny et al. | |
| 2017/0096910 A1 | 4/2017 | Raimarckers et al. | |
| 2017/0113807 A1 | 4/2017 | Burnell et al. | |
| 2017/0114721 A1 | 4/2017 | Miller et al. | |
| 2017/0141419 A1 | 5/2017 | Wu et al. | |
| 2017/0159566 A1 | 6/2017 | Sennoun et al. | |
| 2017/0167382 A1 | 6/2017 | Miller et al. | |
| 2017/0291714 A1 | 10/2017 | Corman | |
| 2017/0321607 A1 | 11/2017 | Sweeney et al. | |
| 2018/0016025 A1 | 1/2018 | Rheaume et al. | |
| 2018/0056233 A1 | 3/2018 | Henson et al. | |
| 2018/0056234 A1 | 3/2018 | Weng et al. | |
| 2018/0071659 A1 | 3/2018 | Rhoden | |
| 2018/0118367 A1 | 5/2018 | Rheaume et al. | |
| 2019/0153952 A1 * | 5/2019 | Niergarth | F02C 7/14 |
| 2020/0086239 A1 | 3/2020 | Cordatos et al. | |
| 2020/0140109 A1 | 5/2020 | O'Connor et al. | |

(56) References Cited

U.S. PATENT DOCUMENTS

2020/0140112 A1    5/2020   O'Connor et al.
2020/0141337 A1    5/2020   O'Connor et al.

FOREIGN PATENT DOCUMENTS

| | | |
|---|---|---|
| EP | 3075957 A1 | 10/2016 |
| EP | 3450724 A1 | 3/2019 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

\* cited by examiner

FUEL OXYGEN REDUCTION UNIT

FIELD

The present disclosure relates to a fuel oxygen reduction unit, such as a fuel oxygen reduction unit for an aeronautical gas turbine engine, and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose.

Certain fuel oxygen conversion systems mix fuel with a relatively low oxygen content stripping gas. The inventors of the present disclosure have found that improvements in this aspect of a fuel oxygen conversion system would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen reduction unit is provided for reducing an oxygen content of a flow of liquid fuel to an engine. The fuel oxygen reduction unit includes: a stripping gas supply line for providing a flow of stripping gas; a contactor defining a liquid fuel inlet, a stripping gas inlet and a fuel/gas mixture outlet, the stripping gas supply line in airflow communication with the stripping gas inlet; a means for modulating the flow of stripping gas through the stripping gas supply line; and a controller operable with the means for modulating the flow of stripping gas through the stripping gas supply line to modulate the flow of stripping gas through the stripping gas supply line in response to an engine operability parameter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a fuel oxygen reduction unit configured to receive a flow of fuel from, e.g., a fuel tank, reduce an oxygen content of such flow of fuel (creating a deoxygenated flow of fuel), and provide the deoxygenated flow of fuel to a gas turbine engine for combustion. Prior to combustion, the deoxygenated flow of fuel may act as a heat sink for a variety of engine and/or aircraft systems. The amount of heat transferred to the deoxygenated flow of fuel may vary based on one or more engine parameters. For example, during high power conditions (e.g., takeoff or climb), a relatively large amount of heat may need to be transferred to the fuel, whereas during a low power condition (e.g., taxi or descent), a relatively small amount of heat may need to be transferred to the fuel. The oxygen content of the deoxygenated flow of fuel may dictate how much heat the deoxygenated flow of fuel may accept before, e.g., coking.

The inventors of the present disclosure have recognized that with certain fuel oxygen reduction units utilizing a contactor and separator to mix stripping gas and liquid fuel and subsequently separate the mixture of stripping gas and liquid fuel, the amount of stripping gas used relative to the amount of liquid fuel directly affects the resulting oxygen content of the deoxygenated flow of fuel, as well as a temperature rise in the flow of liquid fuel across the fuel oxygen reduction unit. Generally, it is preferable for the deoxygenated flow of fuel to be at a lower temperature to facilitate more efficient heat transfer. Accordingly, the inventors of the present disclosure had found that controlling a mass flow rate of a flow of stripping gas relative to a mass flow rate of the flow of liquid fuel provided to the fuel oxygen reduction unit may allow the system to achieve a desired amount of oxygen reduction in the flow of liquid fuel, while minimizing a temperature rise in the flow of liquid fuel.

For example, in at least certain exemplary aspects, the fuel oxygen reduction unit may include a means for modulating the flow of stripping gas through the stripping gas supply line (e.g., a variable speed gas boost pump, a valve, a bleed or recirculation duct), and a controller operable with the means for modulating the flow of stripping gas through the stripping gas supply line to modulate the flow of stripping gas through the stripping gas supply line in response to an engine operability parameter. The engine operability parameter may be any suitable parameter indicative of a desired oxygen content of the deoxygenated flow of fuel to be provided to the engine.

In such a manner, the controller may operate the fuel oxygen reduction unit at less than 100% efficiency in response to the engine operability parameter indicating a higher oxygen content within the deoxygenated flow of fuel is acceptable to provide a desired amount of oxygen reduction for the deoxygenated flow of fuel, while minimizing a temperature rise of the flow of liquid fuel across the fuel oxygen reduction unit.

Figure 1:
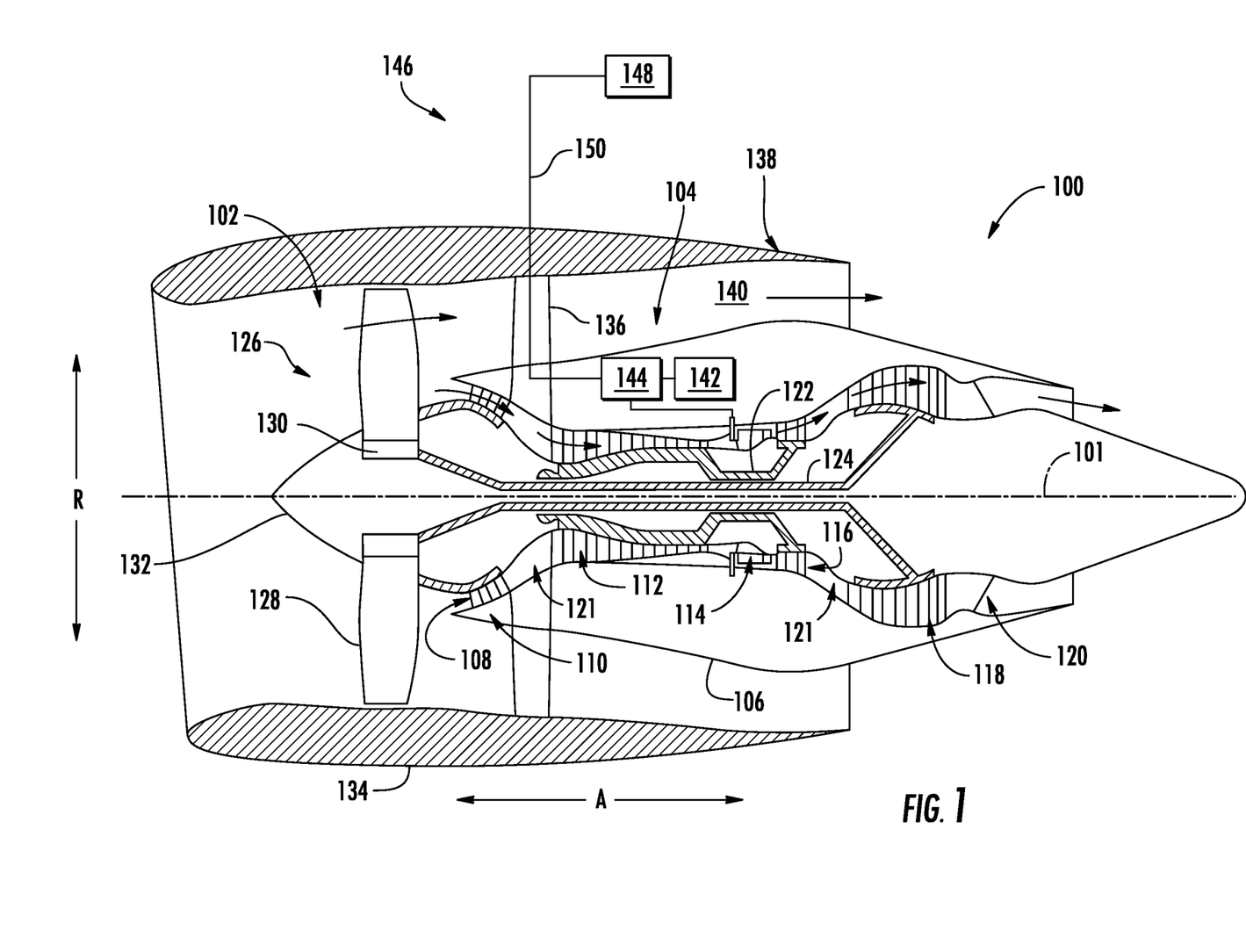
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft or vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flow path 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142. In such a manner, it will be appreciated that the exemplary fuel oxygen reduction unit 144 is driven by the accessory gearbox 142. Notably, as used herein, the term "fuel oxygen reduction unit" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. A more detailed schematic of a fuel delivery system in accordance with an exemplary embodiment of the present disclosure is provided below with reference to FIG. 2.

Moreover, it will be appreciated that although for the embodiment depicted, the turbofan engine 100 includes the accessory gearbox 142 and fuel oxygen reduction unit 144 positioned within the turbomachine 104, i.e., within the casing 106 of the turbomachine 104, in other embodiments, the accessory gearbox 142 and/or fuel oxygen reduction unit 144 may be positioned at any other suitable location. For example, as is depicted in phantom in FIG. 1, in other embodiments, the accessory gearbox 142 and/or the fuel oxygen reduction unit 144 may be positioned within the nacelle 134 of the turbofan engine 100. Alternatively, in still other embodiments, the accessory gearbox 142 may be positioned with the turbofan engine 100 and the fuel oxygen reduction unit 144 may be positioned remote from the turbofan engine 100, such as proximate to, or within, the tank 148 of the fuel delivery system 146. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc. For example, when the accessory gearbox 142 is driven by an electric motor, the electric motor may be configured to receive electrical power from an electric machine/generator being driven by the engine, such as an LP or HP system of the engine.

Figure 2:
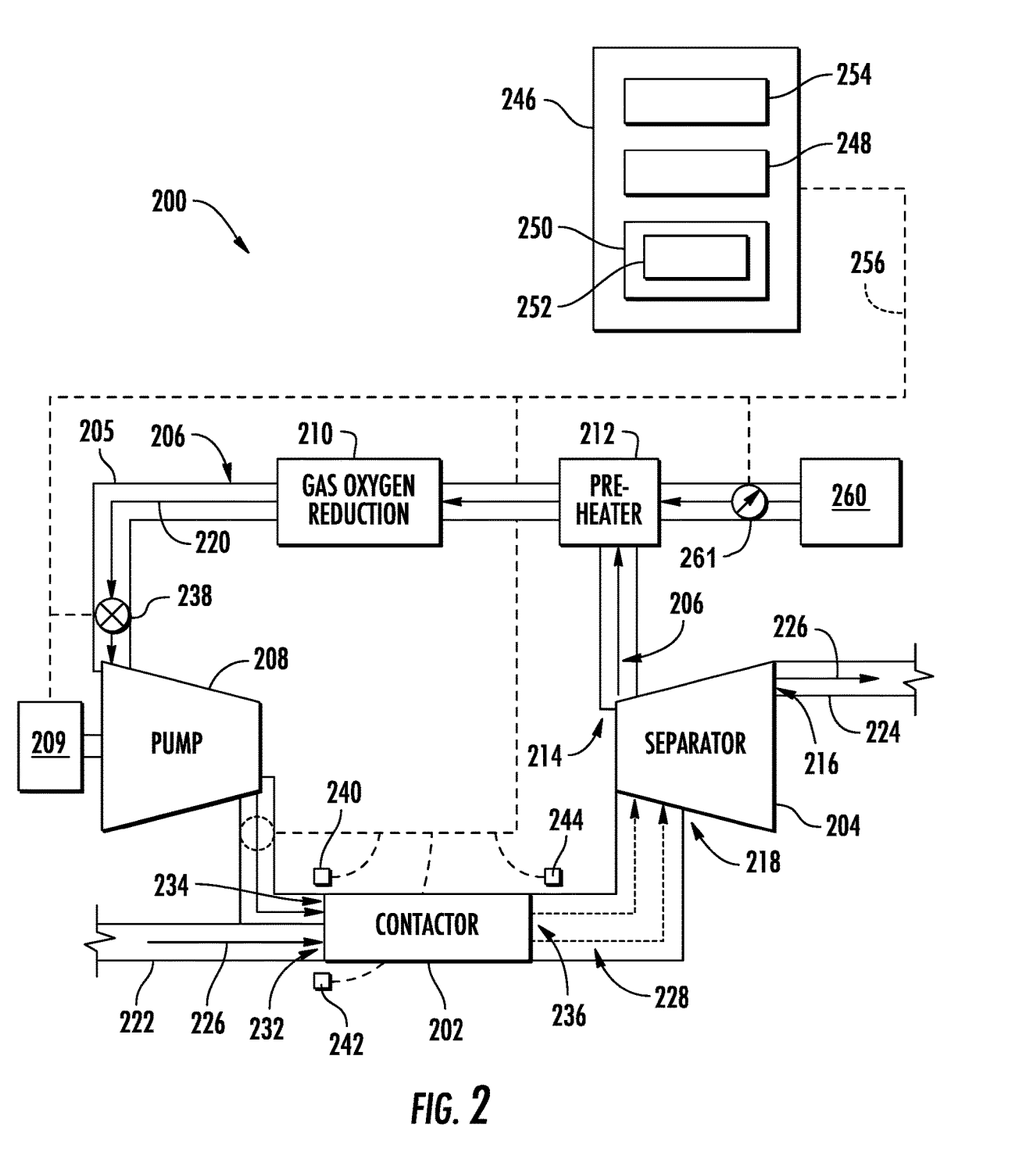
FIG. 2 is a schematic view of a fuel oxygen reduction unit in accordance with an exemplary embodiment of the present disclosure.

Referring now to FIG. 2, a schematic drawing of a fuel oxygen reduction unit 200 for a gas turbine engine in accordance with an exemplary aspect of the present disclosure is provided. In at least certain exemplary embodiments, the exemplary fuel oxygen reduction unit 200 depicted in FIG. 2 may be incorporated into, e.g., the exemplary engine 100 described above with reference to FIG. 1 (e.g., may be the fuel oxygen reduction unit 144 depicted in FIG. 1 and described above).

Alternatively, the fuel oxygen reduction unit 200 may be incorporated into any other suitable exemplary engine, a fuel delivery assembly for any suitable exemplary engine, etc.

As will be appreciated from the discussion herein, the fuel oxygen reduction unit 200 of FIG. 2 generally includes a contactor 202 and a fuel/gas separator 204. The exemplary contactor 202 depicted may be configured in any suitable manner to substantially mix a received gas and liquid flow, as will be described below. For example, the contactor 202 may, in certain embodiments be a mechanically driven contactor (e.g., having paddles for mixing the received flows), or alternatively may be a passive contactor for mixing the received flows using, at least in part, a pressure and/or flowrate of the received flows.

Moreover, the exemplary fuel oxygen reduction unit 200 includes a stripping gas supply line 205 for providing a flow of stripping gas 220, and more specifically, for providing a flow of stripping gas 220 to the contactor 202. For the embodiment shown, the exemplary fuel oxygen reduction unit 200 more particularly includes a plurality of stripping gas supply lines 205 sequentially arranged to together at least in part define a circulation gas flow path 206 extending from the fuel/gas separator 204 to the contactor 202. In certain exemplary embodiments, the circulation gas flow path 206 may be formed of any combination of one or more conduits, tubes, pipes, etc. in addition to the plurality stripping gas supply lines 205 and structures or components within the circulation gas flow path 206.

It will be appreciated that the term "stripping gas" is used herein as a term of convenience to refer to a gas generally capable of performing the functions described herein. The stripping gas 220 flowing through the stripping gas flow path/circulation gas flow path 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide (CO2), an inert gas mixture, or some other gas or gas mixture having a relatively low oxygen content.

Moreover, for the exemplary fuel oxygen reduction unit 200 depicted in FIG. 2, the fuel oxygen reduction unit 200 further includes a gas boost pump 208, a gas oxygen reduction unit 210 (which for the embodiment shown is a catalyst), and a pre-heater 212. For the embodiment shown, the gas boost pump 208, the gas oxygen reduction unit 210, and the pre-heater 212 are each arranged within the circulation gas flow path 206 in series flow. The gas boost pump 208 generally be operable to increase a pressure of the flow of stripping gas to 20 through the stripping gas supply line 205, and more specifically, through the circulation gas flow path 206. Operation of the gas boost pump 208, the gas oxygen reduction unit 210, and the preheater 212 will be further explained below.

Referring still to the embodiment of FIG. 2, it will be appreciated that the fuel/gas separator 204 generally defines a gas outlet 214, a liquid fuel outlet 216, and an inlet 218, and further that the contactor 202 generally defines a liquid fuel inlet 232, a stripping gas inlet 234, and a fuel/gas mixture outlet 236. It will also be appreciated that the exemplary fuel oxygen reduction unit 200 depicted is operable with a fuel delivery system 146, such as a fuel delivery system 146 of the gas turbine engine including the fuel oxygen reduction unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the liquid fuel inlet 232 of the contactor 202 for providing a flow of liquid fuel 226 to the contactor 202 (e.g., from a fuel source, such as a fuel tank) and the outlet fuel line 224 is fluidly connected to the liquid fuel outlet 216 of the fuel/gas separator 204 for receiving a flow of deoxygenated liquid fuel 226 and providing such flow of liquid fuel to, e.g., one or more engines.

Moreover, during typical operations, the flow of stripping gas 220 flows through the circulation gas flow path 206 from the gas outlet 214 of the fuel/gas separator 204 to the stripping gas inlet 234 of the contactor 202. More specifically, during typical operations, stripping gas 220 flows from the gas outlet 214 of the fuel/gas separator 204, through the pre-heater 212 (configured to add heat energy to the gas flowing therethrough), through the gas oxygen reduction unit 210, and to/through the gas boost pump 208, wherein a pressure of the stripping gas 220 is increased to provide for the flow of the stripping gas 220 through the circulation gas flow path 206. The relatively high pressure stripping gas 220 (i.e., relative to a pressure upstream of the boost pump 208 and optionally the fuel entering the contactor 202) is then provided to stripping gas inlet 234 of the contactor 202, where the stripping gas 220 is mixed with the flow of liquid fuel 226 from the inlet fuel line 222 to generate a fuel/gas mixture 228. The fuel/gas mixture 228 generated within the contactor 202 is provided through the fuel/gas mixture outlet 236 of the contactor 202 to the inlet 218 of the fuel/gas separator 204. Within the fuel/gas separator 204 the fuel/gas mixture 228 may be separated back into the flow of liquid fuel 226 and the flow of stripping gas 220.

It will be appreciated, however, that the arrangement depicted in FIG. 2 is provided by way of example only, and in other embodiments, the fuel oxygen reduction unit 200 may instead be arranged in any other suitable manner. For example, the fuel oxygen reduction unit 200 may include the gas boost pump 208 located immediately downstream of the separator 204, upstream of the preheater 212. In such a manner, the gas boost pump 208 may be operable with a gas flow at a lower temperature, which may reduce a wear on the gas boost pump 208.

Generally, it will be appreciated that during operation of the fuel oxygen reduction unit 200, the liquid fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the liquid fuel 226 is mixed with the stripping gas 220, resulting in the fuel/gas mixture 228. As a result of such mixing a physical exchange may occur whereby at least a portion of the oxygen within the fuel 226 is transferred to the stripping gas 220, such that the fuel component of the mixture 228 has a relatively low oxygen content (as compared to the fuel 226 provided through inlet fuel line 222) and the stripping gas component of the mixture 228 has a relatively high oxygen content (as compared to the stripping gas 220 provided through the circulation gas flow path 206 to the contactor 202). The fuel/gas separator 204 separates the relatively high oxygen content stripping gas 220 from the relatively low oxygen content fuel 226.

Further, it will be appreciated that the liquid fuel 226 provided to the liquid fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 226 provided to the liquid fuel outlet 216 may have an oxygen content of less than about five (5) parts per million ("ppm"), such as less than about three (3) ppm, such as less than about two (2) ppm, such as less than about one (1) ppm, such as less than about 0.5 ppm.

Moreover, as will be appreciated, the exemplary fuel oxygen reduction unit 200 depicted recirculates and reuses the stripping gas 220 (i.e., the stripping gas 220 operates in a substantially closed loop). However, the stripping gas 220 exiting the fuel/gas separator 204, having interacted with the liquid fuel 226, may have a relatively high oxygen content. Accordingly, in order to reuse the stripping gas 220, an oxygen content of the stripping gas 220 from the outlet 214 of the fuel/gas separator 204 may need to be reduced. For the embodiment depicted, and as noted above, the stripping gas 220 flows through the pre-heater 212, through the gas oxygen reduction unit 210 where the oxygen content of the stripping gas 220 is reduced, and through the gas boost pump 208. In certain exemplary embodiments, the gas oxygen reduction unit 210 may be configured as a catalyst. With such a configuration, the relatively oxygen-rich stripping gas 220 is reacted within the catalyst to reduce the oxygen content thereof.

It will be appreciated, however, that gas oxygen reduction unit 210 may be configured in any suitable manner to perform such functions (i.e., removal of oxygen from the recirculating stripping gas 220). For example, in certain embodiments, the gas oxygen reduction unit 210 may be configured to enable the reaction of oxygen and fuel vapor present in the oxygen-rich stripping gas 220 to reduce the overall level of free oxygen in the stripping gas 220. However, in other embodiments, the gas oxygen reduction unit 210 may additionally, or alternatively, include geometries of catalytic components through which the relatively oxygen-rich stripping gas 220 flows to reduce an oxygen content thereof. In one or more of these configurations, a byproduct may be produced, such as water, which may be ducted away from the gas oxygen reduction unit 210. Additionally, or alternatively, any other suitable configuration may be provided for reducing the oxygen content of the stripping gas 220.

Notably, however, in other embodiments any other suitable gas oxygen reduction unit may be provided for reducing an oxygen content of the stripping gas 220. For example, in addition to, or in the alternative, the gas oxygen reduction unit may utilize a membrane oxygen reduction system, a combustion reduction system, a plasma reduction system, etc.

In one or more of these embodiments, the gas oxygen reduction unit/gas oxygen reduction unit 210 may be configured to reduce an oxygen content of the stripping gas 220 to less than about five percent (5%) oxygen (O2) by mass, such less than about two percent (2%) oxygen (O2) by mass, such less than about one percent (1%) oxygen (O2) by mass.

The resulting relatively low oxygen content gas is then provided through the remainder of the circulation gas flow path 206 and back to the contactor 202, such that the cycle may be repeated. In such a manner, it will be appreciated that the stripping gas 220 may be any suitable gas capable of undergoing the chemical transitions described above. For example, the stripping gas may be air from an air source 260. The air source 260 may be, e.g., a core air flow path of a gas turbine engine including the fuel oxygen reduction unit 200 (e.g., compressed air bled from an HP compressor 112; see FIG. 1). However, in other embodiments, the stripping gas may instead be any other suitable gas, such as an inert gas, such as Nitrogen or Carbon Dioxide (CO2), an inert gas mixture, or some other gas or gas mixture having a relatively low oxygen content. In such a manner, it will be appreciated that in certain exemplary embodiments, the air from the air source 260 may be a deoxygenated air (or, rather, a deoxygenated gas), or alternatively may be a gas defining a normal or relatively high oxygen content to be reduced through the gas oxygen reduction unit 210.

As is also shown, a valve 261 is provided in flow communication between the gas source 260 and the circulation gas flow path 206. The valve 261 may control a mass flow of the air to the circulation gas flow path 206. In such a manner, the valve 261 may assist with regulating a mass flow rate of the stripping gas 220 flowing through the stripping gas flow path/circulation gas flow path 206.

It will also be appreciated, however, that the exemplary fuel oxygen reduction unit 200 described above is provided by way of example only. In other embodiments, the fuel oxygen reduction unit 200 may be configured in any other suitable manner. For example, in other embodiments, the stripping gas 220 may not flow through a circulation gas flow path 206, and instead the fuel oxygen reduction unit 200 may include an open loop stripping gas flow path, with such flow path in flow communication with a suitable stripping gas source 260, such as a bleed air source, and further may be configured to dump air from the fuel/gas separator 204, e.g., to atmosphere downstream of the fuel/gas separator 204.

Referring still to FIG. 2, it will be appreciated that the fuel oxygen reduction unit 200 further includes a means for modulating the flow of stripping gas 220 through the stripping gas supply line 205 and a controller 246 operable with the means for modulating the flow of stripping gas 220 through the stripping gas supply line 205. As will be explained in more detail below, the controller 246 is operable with the means for modulating the flow of stripping gas 220 through the stripping gas supply line 205 to modulate the flow of stripping gas 220 through the stripping gas supply line 205 in response to an engine operability parameter.

For the embodiment shown, the means for modulating the flow of stripping gas 220 through the stripping gas supply line 205 is the gas boost pump 208. More specifically, for the embodiment shown, the gas boost pump 208 is configured as a variable speed gas boost pump. For example, in the exemplary embodiment shown, the gas boost pump 208 is configured as a rotary gas pump and is coupled to, and driven by, an electric power source 209, which may be a variable speed electric motor. In such a manner, the gas boost pump 208 may increase or decrease in speed to increase or decrease the flow of stripping gas 220 through the stripping gas supply line 205 (i.e., increase or decrease a mass flow rate of the stripping gas 220 through the stripping gas supply line 205 to the contactor 202).

Alternately, however, the variable speed gas boost pump 208 may be configured in any other suitable manner, and may be coupled to, and driven by, any other suitable power source. For example, the gas boost pump 208 may be coupled to a fixed speed power source or a power source that is not capable of varying its speed based on the needs of the fuel oxygen reduction unit 200 (e.g., an accessory gearbox). With such configuration, the means may further include one or more features for modifying a speed of the gas boost pump 208 relative to the power source 209. For example, the gas boost pump 208 may be coupled to the power source 209 through a variable speed transmission, etc.

It will be appreciated, however, that the means for modulating the flow of stripping gas 220 through the stripping gas supply line 205 may additionally or alternatively include other suitable components. For example, in the embodiment shown, the means for modulating the flow of stripping gas 220 through the stripping gas supply line 205 additional includes, or alternatively includes, a fluid control valve 238 configured to vary an amount of the flow of stripping gas 220 through the stripping gas supply line 205 (i.e., vary a mas flow rate of the stripping gas 220 through the stripping gas supply line 205). For the embodiment shown, the fluid control valve 238 is located upstream of the gas boost pump 208, and more specifically upstream of the gas boost pump 208 and downstream of the gas oxygen reduction unit 210, proximate the gas boost pump 208 relative to the gas oxygen reduction unit 210.

However, as is depicted in phantom in FIG. 2, in other embodiments the fluid control valve 238 may additionally or alternatively be located downstream of the gas boost pump 208.

The fluid control valve 238 may be any suitable variable throughput valve capable of modifying the flow of stripping gas 220 through the stripping gas supply line 205 (i.e., capable of modifying a mass flow rate of the stripping gas 220 flow through the stripping gas supply line 205). For example, the fluid control valve 238 may be configured as a ball valve, a butterfly valve, a choke valve, a diaphragm, a piston valve, a plug valve, a solenoid valve, a spool valve, a pressure reduction valve, etc.

It will be appreciated, however, that in other exemplary embodiments, any other suitable means for modulating the flow of stripping gas 220 through the stripping gas supply line 205 may be provided. For example, in other embodiments, the means for modulating the flow of stripping gas 220 through the stripping gas supply line 205 may include a recirculation duct in flow communication with the stripping gas supply line 205 through a three way valve configured to extract a portion of the flow of stripping gas 220 through the stripping gas supply line 205 at a location upstream of the contactor 202 and provide the portion of stripping gas 220 to the circulation gas flowpath 206 at a location downstream of the separator 204 and, e.g., upstream of the gas oxygen reduction unit 210. Additionally or alternatively, the means for modulating the flow of stripping gas 220 through the stripping gas supply line 205 may include a bleed passage in flow communication with the stripping gas supply line 205 through a three way bleed valve for bleeding off a portion of the flow of stripping gas 220 through the stripping gas supply line 205, e.g., to atmosphere to modulate the flow of stripping gas 220 through the stripping gas supply line 205. Other suitable means are contemplated as well.

Moreover, it will also be appreciated that for the embodiment shown, the means for modulating the flow of stripping gas 220 through the stripping gas supply line 205 is generally located upstream of the contactor 202 and downstream of the gas oxygen reduction unit 210. However, in other embodiments, the means for modulating the flow of stripping gas 220 through the stripping gas supply line 205 may additionally or alternatively be located upstream of the gas oxygen reduction unit and downstream the separator 204, or alternatively for open loop configurations, may be positioned at any other suitable location upstream of the contactor 202.

Referring still to FIG. 2, as mentioned briefly above, the exemplary fuel oxygen reduction unit 200 further includes the controller 246 operable with the means for modulating the flow of stripping gas 220 through the stripping gas supply line 205 to modulate the flow of stripping gas 220 through stripping gas supply line 205 in response to the engine operability parameter.

More specifically, it will be appreciated that the controller 246 may be configured to ensure an oxygen content of the flow of deoxygenated liquid fuel 226 provided from the fuel oxygen reduction unit 200 to the engine is sufficiently low to accommodate an anticipated amount of heat transfer to the flow of deoxygenated liquid fuel 226 prior to being combusted. The controller 246 may accomplish this by varying the flow of stripping gas 220 provided to the contactor 202 using the means for modulating the flow of stripping gas 220 through the stripping gas supply line 205, as generally speaking the higher a ratio of stripping gas 220 to liquid fuel 226 provided to the contactor 202, the lower the resulting oxygen content within the flow of liquid fuel 226 from the fuel oxygen reduction unit 200.

The controller 246 may determine the amount of stripping gas 220 needed to provide the desired amount of oxygen reduction in the flow of liquid fuel 226 based at least in part on the engine operability parameter.

The engine operability parameter is generally any parameter indicative of a desired oxygen content of the flow of liquid fuel 226 from the fuel oxygen reduction unit 200 to the engine (e.g., an oxygen content set point, an amount of oxygen reduction needed in the flow of liquid fuel 226, a temperature the liquid fuel 226 is expected to reach or may need to accommodate). In such a manner, it will be appreciated that the engine operability parameter may be indicative of a maximum temperature the flow of liquid fuel 226 from the fuel oxygen reduction unit 200 will reach (or is estimated to reach, or needs to have the capacity to reach) at a location downstream of the fuel oxygen reduction unit 200 prior to being combusted by the engine. For example, the engine operability parameter may be indicative of a flight mode operating condition of the engine (e.g., an idle operating condition, a takeoff/climb operating condition, a cruise operating condition, a taxiing operating condition), or a power output operating mode of the engine (e.g., a low-power operating condition, a high-power operating condition, a rated speed operating condition, etc.). Further, the engine operability parameter may be indicative of or otherwise take into account other factors which may affect the maximum temperature that the flow of liquid fuel 226 from the fuel oxygen reduction unit 200 may reach (or is estimated to reach, or needs to have the capacity to reach), such as ambient conditions (e.g., temperature, pressure), temperatures and/or operating modes of accessory systems of the gas turbine engine (e.g., an engine oil lubrication system), etc. Further, in still other exemplary embodiments, the engine operability parameter may be the maximum allowable oxygen content of the flow of liquid fuel 226, as determined, e.g., by the controller 246 based on, e.g., one or more of the above conditions.

However, it will be appreciated that the process of reducing the oxygen content of the flow of liquid fuel 226 provided to the fuel oxygen reduction unit 200 may increase a temperature of the flow of liquid fuel 226. Specifically, the stripping gas 220 may generally be at a relatively high temperature by virtue of, e.g., passing through the gas oxygen reduction unit 210 (which may be a catalyst or burner) and preheater 212, such that by mixing the flow of liquid fuel 226 with the flow of stripping gas 220 within the contactor 202, the deoxygenated flow of liquid fuel 226 through the outlet fuel line 224 is at a higher temperature than the flow of liquid fuel 226 through the inlet fuel line 222. Further, the higher the ratio of stripping gas 220 to liquid fuel 226 provided to the contactor 202, the higher the temperature rise of the liquid fuel 226.

It will be appreciated that in order to allow the flow of liquid fuel 226 provided through the outlet fuel line 224 to the engine to more efficiently accept heat prior to being combusted, it may be desirable to minimize the amount of temperature rise in the flow of liquid fuel 226 within the fuel oxygen reduction unit 200, such as from the inlet fuel line 222 to the outlet fuel line 224. In such a manner, the controller 246 may be configured to modulate the flow of stripping gas 220 through the stripping gas supply line 205 in response the engine operability parameter to provide precisely the amount of stripping gas 220 to the contactor 202 (or precisely the amount of stripping gas 220 plus some buffer amount), such that fuel oxygen reduction unit 200 provides the desired amount of oxygen reduction to the flow of liquid fuel 226 without unnecessarily increasing the temperature of the flow of liquid fuel 226 in the process.

In at least certain exemplary aspects, in order for the controller 246 to ensure the desired amount of oxygen reduction in the flow of liquid fuel 226 is achieved, the controller 246 may be configured to determine data indicative of an amount of oxygen reduction to the flow of liquid fuel through the fuel oxygen reduction unit 200, such as the current amount of oxygen reduction being achieved by the fuel oxygen reduction unit 200. The data indicative of the amount of oxygen reduction may be data indicative of an oxygen content of the flow of liquid fuel 226 from the fuel oxygen reduction unit 200, data indicative of a reduction in the oxygen content in the flow of liquid fuel 226 from the fuel oxygen reduction unit 200 (e.g., paired with data indicative of a known or estimated starting oxygen content of the liquid fuel 226), etc.

In at least certain exemplary aspects, the controller 246 may be configured to determine data indicative of an amount of oxygen reduction to the flow of liquid fuel through the fuel oxygen reduction unit 200 based on the mass flow rates of the stripping gas 220 and of the liquid fuel 226 to the contactor 202. In such a manner, the controller 246 may be configured to determine data indicative of a mass flow rate of the flow of stripping gas 220 provided to the stripping gas inlet 234 of the contactor 202, a mass flow rate of the flow of liquid fuel 226 provided to the liquid fuel inlet 232 of the contactor 202, or both. In certain exemplary embodiments, such as the exemplary embodiment depicted, it will be appreciated that the fuel oxygen reduction unit 200 further includes a gas inlet temperature sensor 240 for sensing data indicative of a temperature of the flow of stripping gas 220 provided to the stripping gas inlet 234 of the contactor 202, a fuel inlet temperature sensor 242 for sensing data indicative of a temperature of the flow of liquid fuel 226 provided to the fuel inlet 232 of the contactor 202, and an outlet temperature sensor 244 for sensing data indicative of a temperature of a flow of fuel/gas mixture from the fuel/gas mixture outlet 236 of the contactor 202. The controller 246 may be configured to determine data indicative of the mass flow rate of the flow of stripping gas 220 provided to the stripping gas inlet 234 based on the data indicative of the temperature of the flow of stripping gas 220 provided to the stripping gas inlet 234, the data indicative of the temperature of the flow of the fuel/gas mixture from the fuel/gas mixture outlet 236, data indicative of the temperature of the flow of liquid fuel 226 provided to the liquid fuel inlet 232, or a combination thereof.

It will be appreciated, however, that in other embodiments, the controller 246 may be configured to determine the mass flow rate of the flow of stripping gas 220 through the stripping gas supply line 205 to the stripping gas inlet 234 of the contactor 202 in any other suitable manner. For example, in other exemplary embodiments, the gas inlet temperature sensor 240 may instead be configured as a flow sensor for sensing data indicative of the mass flow rate of the flow of stripping gas 220 provided to the stripping gas inlet 234 of the contactor 202. Additionally, or alternatively, the controller 246 may be configured to determine data indicative of an amount of oxygen reduction to the flow of liquid fuel through the fuel oxygen reduction unit 200 in any other suitable manner. For example, the controller 246 may determine data indicative of an amount of oxygen reduction to the flow of liquid fuel through the fuel oxygen reduction unit 200 using a fuel oxygen sensor, or a sensor configured to sense some other parameter indicative of the fuel oxygen content downstream of the fuel oxygen reduction unit 200.

In the exemplary aspect depicted, the controller 246 may further be configured to modulate the flow of stripping gas 220 through the stripping gas supply line 205 in response the data indicative of the amount of oxygen reduction to the flow of liquid fuel through the fuel oxygen reduction unit 200 (e.g., the mass flow rates of the stripping gas 220 and/or the liquid fuel 226).

In such a manner, it will be appreciated that the controller 246 may be configured to increase or decrease the flow of stripping gas 220 through the stripping gas supply line 205 in response to the engine operability parameter and further in response to the data indicative of the amount of oxygen reduction to the flow of liquid fuel through the fuel oxygen reduction unit 200. In such a manner, the fuel oxygen reduction unit 200 may provide a desired amount of oxygen reduction to the flow of liquid fuel 226 provided to the fuel oxygen reduction unit 200, without unnecessarily increasing a temperature of such flow of liquid fuel 226.

For example, the controller 246 may be configured to increase the flow of stripping gas 220 through the stripping gas supply line 205 to the contactor 202 in response to the engine operability parameter indicating a lower fuel oxygen content is needed (e.g., that the flow of liquid fuel 226 from the fuel oxygen reduction unit 200 will need to accommodate a relatively high temperature prior to being combusted), and further may be configured to reduce the flow of stripping gas 220 through the stripping gas supply line 205 to the contactor 202 in response to the engine operability parameter indicating a higher fuel oxygen content is acceptable (e.g., that the flow of liquid fuel 226 from the fuel oxygen reduction unit 200 will only need to accommodate a relatively low temperature prior to being combusted).

In such a manner, the controller 246 may operate the fuel oxygen reduction unit 200 at less than 100% efficiency in response to the engine operability parameter indicating a higher oxygen content within the deoxygenated flow of fuel 226 is acceptable to provide a desired amount of oxygen reduction for the deoxygenated flow of fuel 226, while minimizing a temperature rise of the flow of liquid fuel 226 across the fuel oxygen reduction unit 200.

For example, it will be appreciated that by modulating the flow of stripping gas 220 to the stripping gas supply line 205, the controller 246 may effectively reduce a flow of the stripping gas 220 through the stripping gas supply line 205 to the contactor 202 by at least 10% of a maximum amount (based on a mass flow rate of the stripping gas 220 with no reduction by the means for modulating the flow of stripping gas 220), such as by at least 15%, such as by at least 25%, such as by at least 35%, such as by at least 45%, such as by up to than 90%. Such may allow the fuel oxygen reduction unit 200 to provide the desired amount of oxygen reduction to the flow of liquid fuel 226 (based on the engine operability parameter and the data determined indicative of the present amount of oxygen reduction) without unnecessarily heating the flow of liquid fuel 226 across the fuel oxygen reduction unit 200.

Further by way of example, it will be appreciated that by modulating the flow of stripping gas 220 to the stripping gas supply line 205, the controller 246 may operate the fuel oxygen reduction unit 200 to provide a flow of liquid fuel 226 exiting the fuel oxygen reduction unit 200 with a fuel oxygen content at least 10% higher than if the flow of stripping gas 220 through the stripping gas supply line 205 to the contactor 202 were unrestricted by the means for modulating the flow of stripping gas 220. For example, the controller 246 may operate the fuel oxygen reduction unit 200 to provide a flow of liquid fuel 226 exiting the fuel oxygen reduction unit 200 with a fuel oxygen content at least 20% higher, such as at least 30% higher, such as at least 40% higher, such as at least 50% higher, such as at least 100% higher, such as up to 10000% higher than if the flow of stripping gas 220 through the stripping gas supply line 205 to the contactor 202 were unrestricted by the means for modulating the flow of stripping gas 220. Similarly, such may allow the fuel oxygen reduction unit 200 to provide the desired amount of oxygen reduction to the flow of liquid fuel 226 (based on the engine operability parameter and the data determined indicative of the present amount of oxygen reduction) without unnecessarily heating the flow of liquid fuel 226 across the fuel oxygen reduction unit 200.

Particularly for the embodiment shown, the controller 246 is configured as part of a control system. The controller 246 and control system may be a standalone controller 246 and control system, or alternatively, may be incorporated into, e.g., a controller for the gas turbine engine, a controller for the aircraft, etc. The control system may further include or be in operable communication with the sensors 240, 242, 244 described above, as well as one or more sensors of the gas turbine engine, the aircraft, or both. The one more sensors of the gas turbine engine, the aircraft, or both may provide data indicative of the engine operability parameter. For example, the one or more sensors of the gas turbine engine, the aircraft, or both, may include one or more speed sensors configured to sense data indicative of a rotational speed of one or more shafts of the gas turbine engine, one or temperature sensors configured sense data indicative of a temperature at one or more locations within the gas turbine engine (e.g., compressor exit temperature, turbine inlet temperature, combustor temperature, exhaust gas temperature), etc.

The exemplary controller 246 depicted includes one or more processor(s) 248 and one or more memory device(s) 250. The one or more processor(s) 248 can include any suitable processing device, such as a microprocessor, microcontroller 246, integrated circuit, logic device, and/or other suitable processing device. The one or more memory device(s) 250 can include one or more computer-readable media, including, but not limited to, non-transitory computer-readable media, RAM, ROM, hard drives, flash drives, and/or other memory devices.

Figure 3:
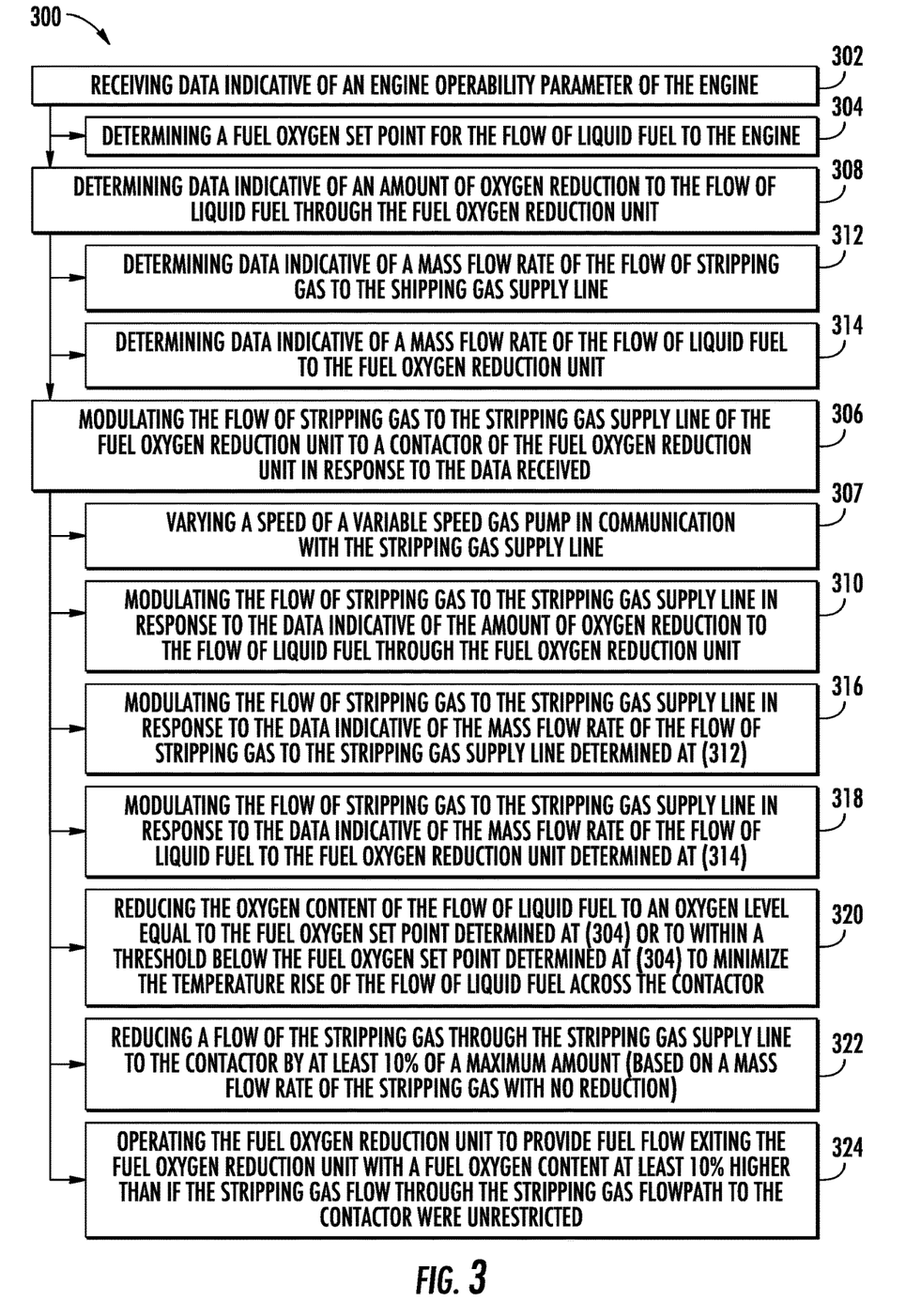
FIG. 3 is a flow diagram of a method for operating a fuel oxygen reduction unit.

The one or more memory device(s) 250 can store information accessible by the one or more processor(s) 248, including computer-readable instructions 252 that can be executed by the one or more processor(s) 248. The instructions 252 can be any set of instructions that when executed by the one or more processor(s) 248, cause the one or more processor(s) 248 to perform operations. In some embodiments, the instructions 252 can be executed by the one or more processor(s) 248 to cause the one or more processor(s) 248 to perform operations, such as any of the operations and functions for which the computing system and/or the controller 246 are configured, the operations for operating a fuel oxygen reduction unit 200 200 (e.g., method 300), as described herein, and/or any other operations or functions. The instructions 252 can be software written in any suitable programming language or can be implemented in hardware. Additionally, and/or alternatively, the instructions 252 can be executed in logically and/or virtually separate threads on processor(s) 248. The memory device(s) 250 can further store data (such as data from sensors 240, 242, 244) that can be accessed by the processor(s) 248.

The exemplary controller 246 depicted also includes a network interface 254 used to communicate, for example, with the components of the fuel oxygen reduction unit 200 (e.g., via a network, or rather a wireless communication network 256 for the embodiment shown). The network interface 254 can include any suitable components for interfacing with one or more network(s), including for example, transmitters, receivers, ports, controllers, antennas, and/or other suitable components.

The inherent flexibility of computer-based systems and controller 246s, however, allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring now to FIG. 3, a method 300 of operating a fuel oxygen reduction unit in accordance with an exemplary aspect of the present disclosure is provided. The exemplary fuel oxygen reduction unit may be configured to provide a flow of liquid fuel to an engine, and as such may be configured in a similar manner as one or more of the exemplary fuel oxygen reduction units described above. However, in other embodiments, the method 300 may be utilized to operate any other suitable fuel oxygen reduction unit.

The method 300 generally includes at (302) receiving data indicative of an engine operability parameter of the engine. The engine operability parameter may be indicative of an amount of oxygen reduction needed in the flow of liquid fuel. For example, the engine operability parameter may be indicative of a temperature the flow of liquid fuel from the fuel oxygen reduction unit will reach downstream of the fuel oxygen reduction unit. For example, in certain exemplary aspects, receiving data indicative of the engine operability parameter of the engine at (302) may include at (304) determining a fuel oxygen set point for the flow of liquid fuel to the engine. The fuel oxygen set point may be the level of oxygen within the flow of liquid fuel needed to accommodate the temperature the flow of liquid fuel is expected to reach prior to being combusted, the desired amount of heat transfer to the flow of liquid fuel, or the like. By way of example, the fuel oxygen set point may vary between five (5) parts per million ("ppm") and 0.5 ppm (or some other suitable range) based on the engine operability parameter.

Referring still to FIG. 3, the exemplary method 300 further includes at (306) modulating the flow of stripping gas to the stripping gas supply line of the fuel oxygen reduction unit to a contactor of the fuel oxygen reduction unit in response to the data received at (302).

For the exemplary aspects shown, modulating the flow of stripping gas to the stripping gas supply line at (306) includes at (307) varying a speed of a variable speed gas pump in communication with the stripping gas supply line.

It will be appreciated, however, that in other exemplary aspects, the flow of stripping gas to the stripping gas supply line may be modulated in any other suitable manner, such as through one or more valves, recirculation ducts, bleed ducts, etc.

More specifically, for the exemplary aspect depicted in FIG. 3, the method 300 further includes at (308) determining data indicative of an amount of oxygen reduction to the flow of liquid fuel through the fuel oxygen reduction unit. The data indicative of the amount of oxygen reduction may be data indicative of an oxygen content of the flow of liquid fuel from the fuel oxygen reduction unit, data indicative of a reduction in the oxygen content in the flow of liquid fuel from the fuel oxygen reduction unit (e.g., paired with data indicative of a known or estimated starting oxygen content of the liquid fuel), etc.

Further for the exemplary aspect shown, modulating the flow of stripping gas to the stripping gas supply line at (306) includes at (310) modulating the flow of stripping gas to the stripping gas supply line in response to the data indicative of the amount of oxygen reduction to the flow of liquid fuel through the fuel oxygen reduction unit at (308).

More specifically for the exemplary aspect depicted, determining data indicative of the amount of oxygen reduction to the flow of liquid fuel through the fuel oxygen reduction unit at (308) includes at (312) determining data indicative of a mass flow rate of the flow of stripping gas to the shipping gas supply line, and at (314) determining data indicative of a mass flow rate of the flow of liquid fuel to the fuel oxygen reduction unit. Further, with such an exemplary aspect, modulating the flow of the stripping gas through the stripping gas supply line at (306) more particularly includes at (316) modulating the flow of stripping gas to the stripping gas supply line in response to the data indicative of the mass flow rate of the flow of stripping gas to the stripping gas supply line determined at (312); and includes at (318) modulating the flow of stripping gas to the stripping gas supply line in response to the data indicative of the mass flow rate of the flow of liquid fuel to the fuel oxygen reduction unit determined at (314).

However, in other exemplary aspects, the method may determine the amount of oxygen reduction to the flow of liquid fuel in any other suitable manner (e.g., directly sensing the oxygen content), and the method 300 may modulate the flow of stripping gas in response to this information.

In such a manner, it will be appreciated that the method 300 may provide for a desired amount of oxygen reduction within the flow of liquid fuel provided to the engine, while minimizing a temperature rise across a contactor of the fuel oxygen reduction unit. For example, by modulating the flow of stripping gas to the stripping gas supply line in response to the received data indicative of the engine operability parameter and further in response to the data determined indicative of the amount of oxygen reduction to the flow of liquid fuel, the method 300 may only provide the amount of stripping gas to the contactor that is necessary to achieve the desired amount of oxygen reduction in the flow of liquid fuel to allow the flow of liquid fuel to accommodate the desired amount of temperature rise prior to being combusted.

In such a manner, it will be appreciated that in certain example aspects, modulating the flow of stripping gas to the stripping gas supply line at (306) may include at (320) reducing the flow of stripping gas to the stripping gas supply line in response to the received data at (302) and optionally further in response to the data determined at (308). For example, the data received at (302) may be indicative of a reduction in the maximum temperature the flow of liquid fuel from the fuel oxygen reduction unit will need to accommodate downstream of the fuel oxygen reduction unit prior to being combusted. For example, reducing flow of stripping gas to the stripping gas supply line at (318) may include at (320) reducing the oxygen content of the flow of liquid fuel to an oxygen level equal to the fuel oxygen set point determined at (304) or to within a threshold below the fuel oxygen set point determined at (304) to minimize the temperature rise of the flow of liquid fuel across the contactor. The threshold may be 10% or less of the fuel oxygen set point, such as 8% or less of the fuel oxygen set point, such as 5% or less of the fuel oxygen set point. For example, if the fuel oxygen set point is 5 ppm, and the threshold is 10%, reducing the oxygen content at (320) may include reducing the oxygen content to between 4.5 ppm and 5 ppm.

Further, in such a manner, it will be appreciated that modulating the flow of stripping gas to the stripping gas supply line at (306) may include at (322) reducing a flow of the stripping gas through the stripping gas supply line to the contactor by at least 10% of a maximum amount (based on a mass flow rate of the stripping gas with no reduction), such as by at least 15%, such as by at least 25%, such as by at least 35%, such as by at least 45%, such as by up to than 90%. Such may allow the method 300 to provide the desired amount of oxygen reduction to the flow of liquid fuel (based on the engine operability parameter and the data determined at (308)) without unnecessarily heating the flow of liquid fuel.

Further, it will be appreciated that modulating the flow of stripping gas to the stripping gas supply line at (306) may include at (324) operating the fuel oxygen reduction unit to provide fuel flow exiting the fuel oxygen reduction unit with a fuel oxygen content at least 10% higher than if the stripping gas flow through the stripping gas flowpath to the contactor were unrestricted, such as at least 20% higher, such as at least 30% higher, such as at least 40% higher, such as at least 50% higher, such as at least 100% higher, such as up to 10000% higher. Similarly, such may also allow the method 300 to provide the desired amount of oxygen reduction to the flow of liquid fuel (based on the engine operability parameter and the data determined at (308)) without unnecessarily heating the flow of liquid fuel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A fuel oxygen reduction unit for reducing an oxygen content of a flow of liquid fuel to an engine, the fuel oxygen reduction unit comprising: a stripping gas supply line for providing a flow of stripping gas; a contactor defining a liquid fuel inlet, a stripping gas inlet and a fuel/gas mixture outlet, the stripping gas supply line in airflow communication with the stripping gas inlet; a means for modulating the flow of stripping gas through the stripping gas supply line; and a controller operable with the means for modulating the flow of stripping gas through the stripping gas supply line to modulate the flow of stripping gas through the stripping gas supply line in response to an engine operability parameter.

The fuel oxygen reduction unit of one or more of these clauses, wherein the engine operability parameter is indicative of an amount of oxygen reduction needed in the flow of liquid fuel provided to the liquid fuel inlet of the contactor.

The fuel oxygen reduction unit of one or more of these clauses, wherein the controller is configured to determine data indicative of a mass flowrate of the flow of stripping gas provided to the stripping gas inlet of the contactor, a mass flowrate of the flow of liquid fuel provided to the liquid fuel inlet of the contactor, or both, and wherein the controller is further configured to modulate the flow of stripping gas through the stripping gas supply line in response to the data indicative of the mass flowrate the flow of stripping gas, the data indicative of the mass flowrate of the flow of liquid fuel, or both.

The fuel oxygen reduction unit of one or more of these clauses, wherein the controller is further configured to modulate the flow of stripping gas through the stripping gas supply line in response to the data indicative of the mass flowrate the flow of stripping gas and the data indicative of the mass flowrate of the flow of liquid fuel.

The fuel oxygen reduction unit of one or more of these clauses, further comprising: a gas inlet temperature sensor for sensing data indicative of a temperature of the flow of stripping gas provided to the stripping gas inlet of the contactor; and an outlet temperature sensor for sensing data indicative of a temperature of a flow of fuel/gas mixture from the fuel/gas mixture outlet, and wherein the controller is configured to determine data indicative of the mass flowrate of the flow of stripping gas provided to the stripping gas inlet based on the data indicative of the temperature of the flow of stripping gas provided to the stripping gas inlet and the data indicative of the temperature of the flow of fuel/gas mixture.

The fuel oxygen reduction unit of one or more of these clauses, further comprising a flow sensor for sensing data indicative of the mass flowrate of the flow of stripping gas provided to the stripping gas inlet of the contactor.

The fuel oxygen reduction unit of one or more of these clauses, wherein the controller is configured to increase the flow of stripping gas through the stripping gas supply line in response to the engine operability parameter indicating a lower fuel oxygen content is needed.

The fuel oxygen reduction unit of one or more of these clauses, wherein the controller is configured to reduce the flow of stripping gas through the stripping gas supply line in response to the engine operability parameter indicating a higher fuel oxygen content is acceptable.

The fuel oxygen reduction unit of one or more of these clauses, wherein the controller is configured to reduce the flow of stripping gas through the stripping gas supply line by at least 10% of a maximum amount in response to the engine operability parameter.

The fuel oxygen reduction unit of one or more of these clauses, wherein the means for modulating the flow of stripping gas through the stripping gas supply line comprises a variable speed gas boost pump in flow communication with the stripping gas supply line.

The fuel oxygen reduction unit of one or more of these clauses, wherein the means for modulating the flow of stripping gas through the stripping gas supply line comprises a fluid control valve configured to vary an amount of the flow of stripping gas through the stripping gas supply line.

A method of operating a fuel oxygen reduction unit configured to provide a flow of liquid fuel to an engine, the method comprising: receiving data indicative of an engine operability parameter of the engine, the engine operability parameter indicative of an amount of oxygen reduction needed in the flow of liquid fuel; and modulating a flow of stripping gas through a stripping gas supply line of the fuel oxygen reduction unit to a contactor of the fuel oxygen reduction unit in response to the received data.

The method of one or more of these clauses, wherein the engine operability parameter is indicative of a temperature the flow of liquid fuel from the fuel oxygen reduction unit will reach downstream of the fuel oxygen reduction unit.

The method of one or more of these clauses, wherein modulating the flow of stripping gas through the stripping gas supply line comprises reducing the flow of stripping gas through the stripping gas supply line in response to the received data.

The method of one or more of these clauses, wherein the received data is indicative of a reduction in a temperature the flow of liquid fuel from the fuel oxygen reduction unit will reach downstream of the fuel oxygen reduction unit.

The method of one or more of these clauses, wherein receiving data indicative of the engine operability parameter of the engine comprises determining a fuel oxygen setpoint for the flow of liquid fuel to the engine, and wherein reducing the flow of stripping gas through the stripping gas supply line in response to the received data comprises reducing an oxygen content of the flow of liquid fuel to within a threshold of the fuel oxygen setpoint to minimize a temperature rise of the flow of liquid fuel across the contactor.

The method of one or more of these clauses, wherein modulating the flow of stripping gas through a stripping gas supply line comprises varying a speed of a variable speed gas boost pump in flow communication with the stripping gas supply line.

The method of one or more of these clauses, further comprising: determining data indicative of a mass flowrate of the flow of stripping gas through the stripping gas supply line; wherein modulating the flow of stripping gas through the stripping gas supply line further comprises modulating the flow of stripping gas through the stripping gas supply line in response to the data indicative of the mass flowrate of the flow of stripping gas through the stripping gas supply line.

The method of one or more of these clauses, further comprising: determining data indicative of a mass flowrate of the flow of liquid fuel to the fuel oxygen reduction unit; wherein modulating the flow of stripping gas through the stripping gas supply line further comprises modulating the flow of stripping gas through the stripping gas supply line in response to the data indicative of the mass flowrate of the flow of liquid fuel to the fuel oxygen reduction unit.

The method of one or more of these clauses, wherein modulating the flow of stripping gas to the stripping gas supply line includes operating the fuel oxygen reduction unit to provide fuel flow exiting the fuel oxygen reduction unit with a fuel oxygen content at least 10% higher than if the stripping gas flow through the stripping gas flowpath to the contactor were unrestricted.

I claim:

1. A method of operating a fuel oxygen reduction unit configured to provide a flow of liquid fuel to an engine, the method comprising:
   receiving data indicative of an engine operability parameter of the engine, the engine operability parameter that is an indicative of an amount of oxygen reduction needed in the flow of liquid fuel, wherein the engine operability parameter is indicative of a temperature of the flow of liquid fuel from the fuel oxygen reduction unit will reach downstream of the fuel oxygen reduction unit; and
   reducing a flow of stripping gas through a stripping gas supply line of the fuel oxygen reduction unit to a contactor of the fuel oxygen reduction unit by adjusting a control valve in response to the received data.

2. The method of claim 1, wherein the received data is indicative of a reduction in a temperature of the flow of liquid fuel from the fuel oxygen reduction unit will reach downstream of the fuel oxygen reduction unit.

3. The method of claim 2, wherein the receiving data indicative of the engine operability parameter of the engine comprises determining a fuel oxygen setpoint for the flow of liquid fuel to the engine, and wherein reducing the flow of stripping gas through the stripping gas supply line in response to the received data comprises reducing an oxygen content of the flow of liquid fuel to within a threshold of the fuel oxygen setpoint to minimize a temperature rise of the flow of liquid fuel across the contactor.

4. The method of claim 1, wherein the reducing the flow of stripping gas through a stripping gas supply line comprises varying a speed of a variable speed gas boost pump in flow communication with the stripping gas supply line.

5. The method of claim 1, further comprising:
   determining data indicative of a mass flowrate of the flow of stripping gas through the stripping gas supply line;
   wherein the reducing the flow of stripping gas through the stripping gas supply line further comprises reducing the flow of stripping gas through the stripping gas supply line in response to the data indicative of the mass flowrate of the flow of stripping gas through the stripping gas supply line.

6. The method of claim 1, further comprising:
   determining data indicative of a mass flowrate of the flow of liquid fuel to the fuel oxygen reduction unit;
   wherein reducing the flow of stripping gas through the stripping gas supply line further comprises reducing the flow of stripping gas through the stripping gas supply line in response to the data indicative of the mass flowrate of the flow of liquid fuel to the fuel oxygen reduction unit.

7. The method of claim 1, wherein the reducing the flow of stripping gas through the stripping gas supply line includes operating the fuel oxygen reduction unit to provide fuel flow exiting the fuel oxygen reduction unit with a fuel oxygen content at least 10% higher if the flow of stripping gas through the stripping gas supply line to the contactor were unrestricted.

8. The method of claim 1, wherein reducing the flow of stripping gas through the stripping gas supply line of the fuel oxygen reduction unit comprises operating the fuel oxygen reduction unit at less than 100% efficiency.

9. The method of claim 1, wherein the reducing the flow of stripping gas through a stripping gas supply line further comprises:
   reducing an amount of stripping gas through a stripping gas supply line of the fuel oxygen reduction unit to a contactor of the fuel oxygen reduction unit by at least 10% by adjusting a control valve in response to the received data.

10. A method of operating a fuel oxygen reduction unit configured to provide a flow of liquid fuel to an engine, the method comprising:
   receiving data indicative of an engine operability parameter of the engine, the engine operability parameter that is an indicative of an amount of oxygen reduction needed in the flow of liquid fuel;
   sensing, with a gas inlet temperature sensor, gas inlet data indicative of a temperature of a flow of stripping gas provided to a stripping gas inlet of a contactor;
   sensing, with a fuel inlet temperature sensor, fuel inlet data indicative of a temperature of the flow of liquid fuel provided to a fuel inlet of the contactor;
   sensing, an outlet temperature sensor, mixture data indicative of a temperature of a flow of fuel/gas mixture from a fuel/gas mixture outlet of the contactor;

determining data indicative of a mass flowrate of the flow of stripping gas through a stripping gas supply line based on the gas inlet data, the fuel inlet data, and the mixture data; and modulating an amount of stripping gas through the stripping gas supply line of the fuel oxygen reduction unit to a contactor of the fuel oxygen reduction unit in response to the received data and in response to the to the data indicative of the mass flowrate of the flow of stripping gas through the stripping gas supply line.

11. A method of operating a fuel oxygen reduction unit configured to provide a flow of liquid fuel to an engine, the method comprising:

receiving data indicative of an engine operability parameter of the engine, the engine operability parameter that is an indicative of an amount of oxygen reduction needed in the flow of liquid fuel, wherein the engine operability parameter is indicative of a temperature the flow of liquid fuel from the fuel oxygen reduction unit will reach downstream of the fuel oxygen reduction unit; and reducing a flow of stripping gas through a stripping gas supply line of the fuel oxygen reduction unit to a contactor of the fuel oxygen reduction unit by adjusting a control valve in response to the received data, wherein the reducing the flow of stripping gas through a stripping gas supply line comprises varying a speed of a variable speed gas boost pump in flow communication with the stripping gas supply line, wherein all of the stripping gas in the stripping gas supply line flows through the variable speed gas boost pump and into the contractor.

* * * * *